(12) United States Patent
Mola

(10) Patent No.: US 7,305,762 B2
(45) Date of Patent: Dec. 11, 2007

(54) METHOD FOR PRODUCTION OF A ROTOR OF A CENTRIFUGAL COMPRESSOR

(75) Inventor: Paolo Mola, S. Francesco Pontassieve (IT)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 10/642,238

(22) Filed: Aug. 18, 2003

(65) Prior Publication Data
US 2004/0093727 A1 May 20, 2004

(30) Foreign Application Priority Data
Sep. 3, 2002 (IT) .......................... MI2002A1876

(51) Int. Cl.
*B23P 15/00* (2006.01)
(52) U.S. Cl. .................. 29/888.024; 29/889.4; 29/557
(58) Field of Classification Search ........... 29/888.024, 29/888.025, 889.4, 889.7, 889.72, 557; 409/143, 409/192, 203, 213, 217, 131, 132; 415/203, 415/206
See application file for complete search history.

(56) References Cited

U.S. PATENT DOCUMENTS

| | | | | |
|---|---|---|---|---|
| 1,959,703 A | * | 5/1934 | Birmann | 416/183 |
| 2,396,488 A | * | 3/1946 | Bolas et al. | 409/102 |
| 2,429,324 A | * | 10/1947 | Meisser | 416/188 |
| 2,962,941 A | * | 12/1960 | Stein et al. | 409/122 |
| 4,596,501 A | * | 6/1986 | Wu | 409/131 |
| 5,438,755 A | * | 8/1995 | Giberson | 29/889 |
| 6,077,002 A | * | 6/2000 | Lowe | 409/132 |
| 6,112,133 A | * | 8/2000 | Fishman | 700/182 |
| 6,354,780 B1 | * | 3/2002 | Davis et al. | 414/146 |

FOREIGN PATENT DOCUMENTS

| | | | |
|---|---|---|---|
| DE | 2616308 | * | 10/1977 |
| DE | 3816674 | * | 11/1989 |
| DE | 199 12 715 A1 | | 9/2000 |
| EP | 0233555 | * | 8/1987 |
| EP | 0 992 310 A2 | | 4/2000 |
| EP | 1 211 009 A1 | | 6/2002 |
| EP | 1211009 A1 | * | 6/2002 |
| JP | 61-109608 | * | 5/1986 |
| JP | 01-257797 | * | 10/1989 |
| JP | 10-006119 | * | 1/1998 |
| JP | 2002-036020 | * | 2/2002 |
| SU | 1325778 | * | 7/1990 |

OTHER PUBLICATIONS

"CNC Improves Aerospace Shop's Multiaxis Machining" Manufacturing Engineering. vol. 124, No. 5. May 2000.*

* cited by examiner

Primary Examiner—Jermie E. Cozart
(74) Attorney, Agent, or Firm—Nixon & Vanderhye, PC

(57) ABSTRACT

An improved method for production of a rotor (10) of a centrifugal compressor, wherein the rotor (10) is produced from a monolithic disc; this disc is worked in a radial direction by at least one tool (20) of a numerical control machine, such as to remove shavings, so as to produce radial cavities (12) in the rotor (10).

19 Claims, 3 Drawing Sheets

METHOD FOR PRODUCTION OF A ROTOR OF A CENTRIFUGAL COMPRESSOR

BACKGROUND

The present invention relates to an improved method for production of a rotor of a centrifugal compressor.

The term centrifugal compressor normally defines a machine which returns a compressible fluid at a pressure which is greater than that at which it received the fluid, by imparting to the fluid the energy necessary for the change of pressure, by means of use of one or a plurality of rotors or impellers.

Each rotor comprises a certain number of blades, which are disposed radially such as to form a certain number of passages which converge towards the centre of the rotor.

Centrifugal compressors, particularly those of the high-pressure type, are normally equipped with rotors which are tested three-dimensionally in a known manner.

More particularly, the main parts of these rotors for centrifugal compressors are the hub, the shroud and the blades.

Owing to the high density of the gases, a truly critical problem in the technical field of compressors, in particular those of the high-pressure type, is that of guaranteeing the stability of the rotor.

Combined forces, which are proportional to the density of the gas and are induced by the gas labyrinth, can cause unacceptable subsynchronous vibrations, which have detrimental effects on the said rotor.

In fact, the sensitivity of the rotor to these forces increases more or less proportionally, together with the flexibility of the rotor.

In addition, the entire dynamic performance of the rotor is particularly critical for this type of application, and the simplest means for increasing the rigidity of the rotor in the same operative conditions (i.e. with the same bearings, same temperature, same pressure of the gas, etc.), is that of using shafts which have large diameters.

The diameters both of the shafts and of the hubs have therefore been increased in the known art, such as to increase the rigidity and insensitivity to external disturbances, and thus such as to improve the characteristic rotodynamic performance of the centrifugal compressors at high pressure.

The spacers have therefore been eliminated, and the aerodynamic path is obtained directly on the shaft.

More specifically, two rings maintain the axial position: a front ring is in two pieces and a rear ring is in a single piece. In addition, a covering of material with a high level of hardness protects the shaft.

These characteristics ensure that the aerodynamic path does not change, and mean that this configuration is particularly efficient in increasing the rigidity of the shaft: however, these changes mean that a different technology must be taken into consideration for production of these rotors for centrifugal compressors.

With particular reference to the known art, it should be noted that the blades are traditionally obtained by means of milling of the hub, and subsequently welding is carried out from the interior of the opening in order to join the parts.

Another technique is used for rotors with a low flow coefficient, wherein the openings are too narrow to make it possible to carry out the welding from the interior. In this technique, the two parts are welded from the shroud.

Thus, after having carried out the welding, it is also necessary to carry out the heat treatment, which, it will be appreciated, is used to reduce the residual tensions which have formed.

BRIEF SUMMARY

The object of the present invention is thus to make improvements to the technologies previously described, and in particular to indicate an improved method for production of a rotor of a centrifugal compressor, which makes it possible to obtain optimum dimensional accuracy which is in line with the corresponding expectations.

Another object of the present invention is to indicate an improved method for production of a rotor of a centrifugal compressor, which makes it possible to obtain impellers with a high level of structural strength.

Another object of the present invention is to indicate an improved method for production of a rotor of a centrifugal compressor which is particularly reliable, simple and functional, and has costs which are low in relation to those of the known art.

These objects and others according to the present invention are achieved by indicating an improved method for production of a rotor of a centrifugal compressor, as described in claim 1.

Further characteristics of an improved method for production of a rotor of a centrifugal compressor are described in the successive claims.

By means of the improved method according to the invention, for production of a rotor of a centrifugal compressor, a rotor which is free from structural discontinuities is advantageously obtained.

In addition, it will be possible to produce rotors with very good mechanical characteristics.

Advantageously, the working of the aerodynamic surfaces is carried out using automated operations, thus avoiding any manual intervention.

In addition, by means of the improved method according to the present invention, for production of a rotor of a centrifugal compressor, optimum dimensional accuracy is obtained, according to the design requirements, owing also to the lack of distortions caused by the welding.

The surface quality obtained is very good, it is virtually free from defects, and has optimum aerodynamic efficiency.

By eliminating the welding operations, reductions of up to 70% are obtained in the cycle times necessary in order to produce an impeller.

It will be noted that the balancing operations are facilitated as a result of obtaining more regular surfaces.

All of these advantages are particularly significant in high-pressure re-injection machines where, owing to the high pressures and the high densities of the gases, detrimental periodic forces may arise. By using the method according to the invention, there are no longer metallurgical discontinuities inside the rotor, and this gives rise to a decisive reduction of these forces.

Finally, the welding used in the known art causes distortions which lead to variations of the width of the rotor blades, of 5% or more, particularly in the case of impellers with a low flow rate. On the other hand, by means of the method according to the invention, working accuracy of 1 or 2% is guaranteed.

The characteristics and advantages of an improved method according to the present invention, for production of a rotor of a centrifugal compressor, will become clearer and more apparent from the following description, provided by way of non-limiting example with reference to the attached schematic drawings.

DETAILED DESCRIPTION OF THE DRAWINGS

The method according to the invention will now be described with particular reference to the figures in question.

In order to produce a rotor, which is indicated as 10 as a whole, according to the method of the invention, the starting point is a monolithic disc, which is generally made of steel.

The procedure then takes place using numerical control machines.

In recent years, the tools used in these machines with a plurality of controlled axes have made it possible to increase considerably the capacity for removal of the metal material, also reducing the setting times, owing to the fact that they can carry out various types of working. In addition, by means of these recent tools, working of particularly complicated forms is possible.

For example, as a result of the development of modern control software, some tools can mill, fold and drill an item by means of a single setting, whereas in the past three different settings were necessary, without taking into consideration the fact that until recently three separate tools were required.

Figure 1:
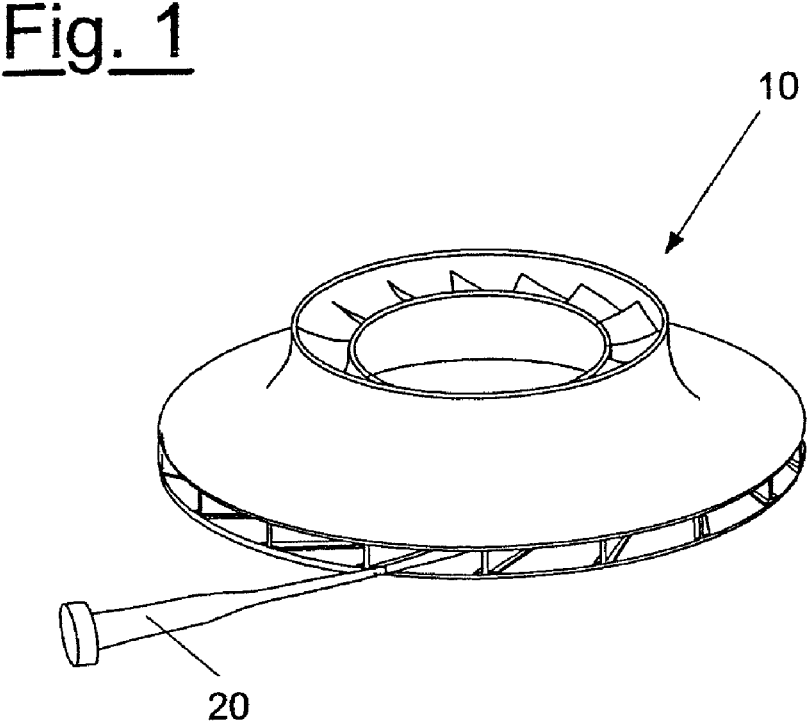
FIG. 1 is an axonometric view of a rotor of a centrifugal compressor, which shows a tool which is working starting from an outer diameter of the rotor itself, according to the method of the present invention.

FIG. 1 shows how the monolithic disc is worked by a tool 20, in a radial direction, starting from an outer diameter, until an external portion of cavity is produced.

The tool 20, which advances with successive terracing operations, works until it reaches a depth which is intermediate in relation to an overall width of the circular ring of the monolithic disc.

Figure 2:
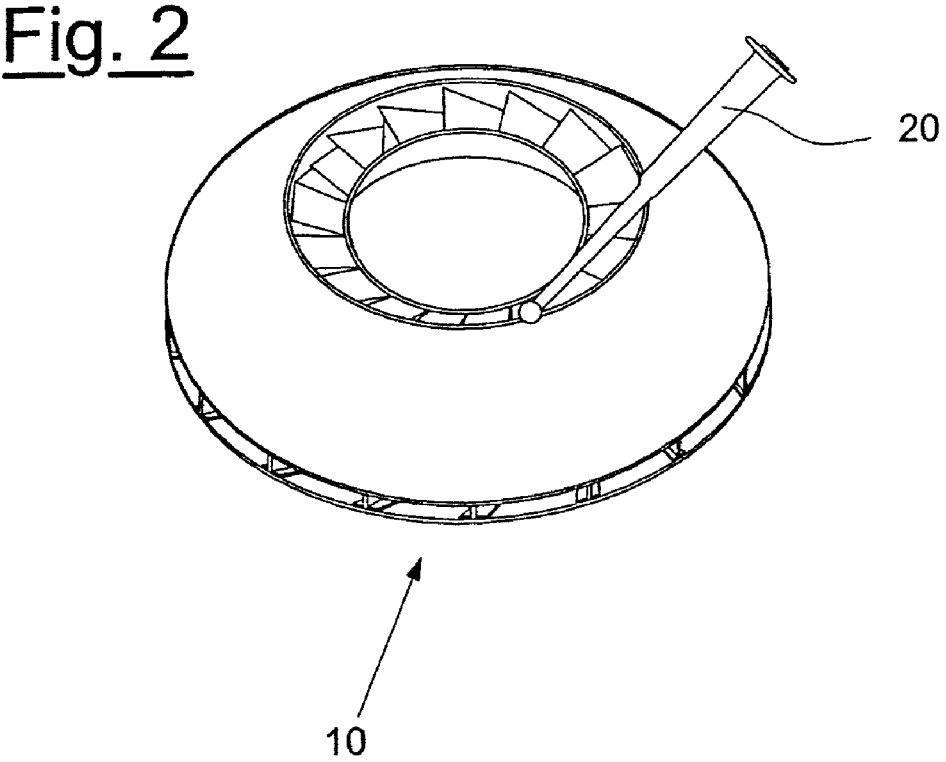
FIG. 2 is an axonometric view of a rotor of a centrifugal compressor, which shows a tool which is working starting from an inner diameter of the rotor itself, according to the method of the present invention.

FIG. 2 shows how the monolithic disc is worked by the tool 20, in a radial direction, starting from an inner diameter.

The tool 20, which advances with successive terracing operations, works until it reaches the outer cavity previously produced, thus forming a required radial cavity 12.

Figure 3:
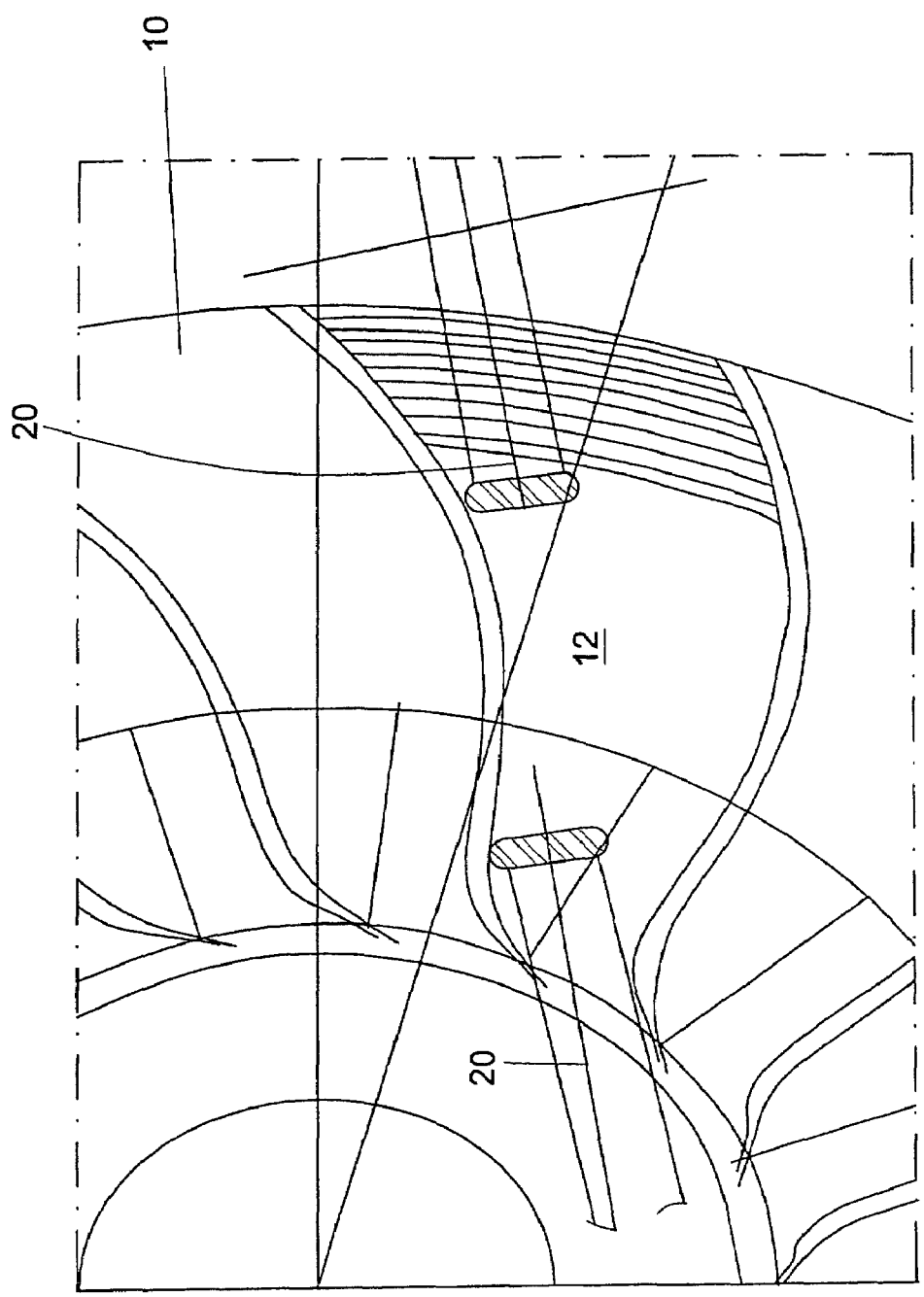
FIG. 3 is a cross-section in plan view of a portion of rotor, which shows tools which are working starting from an inner diameter and from an outer diameter of the rotor itself, according to the method of the present invention.
Figure 4:
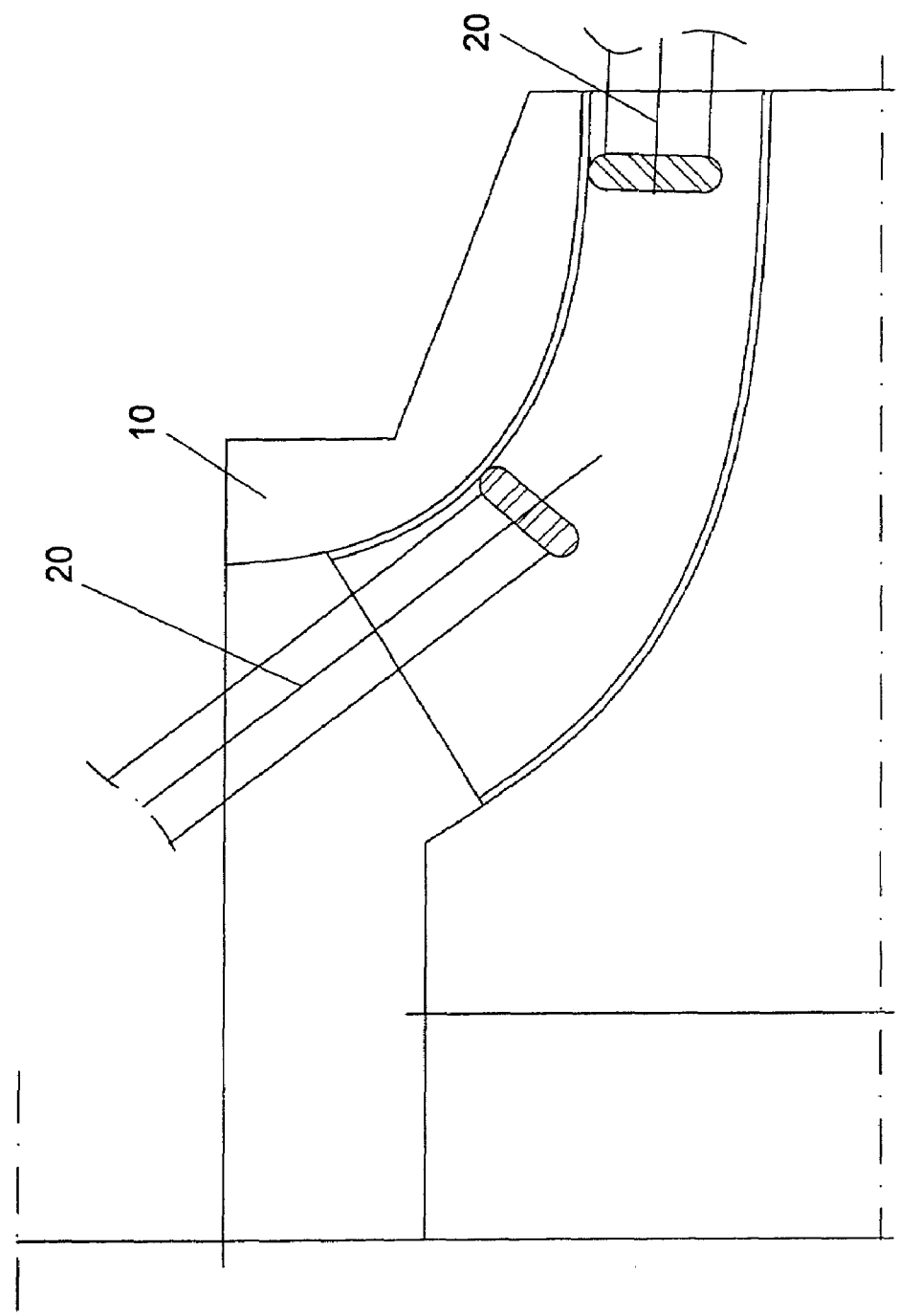
FIG. 4 is a cross-section in lateral elevation of a portion of rotor, showing tools which are working starting from an upper plane and from an outer diameter of the rotor itself, according to the method of the present invention.

FIGS. 3 and 4 show tools 20 which are producing radial cavities 12 of this type.

It is apparent that the present invention also relates to monolithic discs which are worked firstly from the interior and then from the exterior. Cases are not lacking in which the two working operations take place simultaneously, using two tools which are positioned on two controlled axes of one or more numerical control machines.

It is emphasised that the production of each radial cavity 12 advantageously takes place in two separate stages: the first includes working which starts from an outer diameter and goes as far as the furthest point which can be reached inside the disc, and the second relates to completion of the duct to be produced, with working which starts from an inner diameter, i.e. from an area in the vicinity of an intake edge of the rotor 10, and goes towards the exterior.

It is useful to note that, before the said two stages, a preliminary stage is activated in order to determine the feasibility of the working. In other words, it must be possible to ascertain whether there will be superimposition of the two stages (to be determined by evaluating the dimensions of the tools) and whether the tools 20 which are necessary are available.

If one or both of these conditions does not exist, an abnormality is indicated, and this interrupts a working programme.

In this context it must be made possible to use more than one tool 20 assembly during the working, starting with the shortest, which will also be the first one described within the set of tools 20 available.

The diameter of the tool 20 to be used must be selected according to the radius of connection at the base of the blade.

The technology for removal of the shavings must be that of the type known by the name of pocket (starting from the centre and continuing towards the outer perimeter, to be carried out in conformity) with a depth, obtained by means of successive terracing operations, the extent of which must depend on the tools 20 selected and on the level of finishing to be obtained. For this reason it is provided that, during a stage of preparation, these data are entered by means of variables.

After a first stage of so-called pocketing, which must be carried out with a single inclination of the axis of the tool 20 until the maximum depth is obtained, and using the possibility of working with undercut owing to the design of the tool 20, a command must be transmitted to the axis, to take the tool 20 to a different inclination.

By this means it becomes possible to obtain a greater depth.

This increase in inclination is advantageously implemented by means of a numerical control machine with five controlled axes.

If several re-positioning operations are necessary for completion of the cavity, the operations are executed in succession until the maximum depth possible is reached.

Account must be taken of the overall dimensions of the tool 20 in order to prevent interferences on the finished surfaces and on the dimensions constituted by the outer profiles. The overall dimensions of the tool-holder must also be checked, to ensure that the latter does not collide with any surface.

For this purpose, in the stage during which work is taking place from the exterior, since the oscillation of the axis of the tool 20 will almost always take place in a negative direction, amongst the dimensions to be taken into consideration account must be taken of the mandrel support and the rotary table.

It should be noted that tools 20 which are of an altogether known type are used for the said method.

It will be appreciated that, after the working to remove the shavings has been carried out, the impellers can be subjected to heat treatment, which will be followed by stages of checking of the dimensions, balancing, and dynamic checking of the rotor.

The description provided makes apparent the characteristics of the improved method for production according to the present invention, of a rotor of a centrifugal compressor, and also makes apparent the corresponding advantages.

The following concluding considerations and comments are now made, such as to define the said advantages more accurately and clearly.

Firstly, it is found that with the method according to the present invention, there are no structural discontinuities on the rotor.

In addition, the following should be remembered:

the mechanical characteristics of the rotor are very good;

there is the possibility of working the aerodynamic surfaces with automated operations, thus preventing any manual intervention;

there is optimum dimensional accuracy, according to the design requirements, owing also to the lack of distortions caused by the welding;

the surface quality is very good, it is virtually free from defects, and has optimum aerodynamic efficiency;

the elimination of the welding operations provides reductions of up to 70% of the cycle times for production of an impeller; and the balancing operations are facilitated, since more regular surfaces are obtained.

All these advantages are particularly important in high-pressure re-injection machines.

In fact, the high pressures and high densities of the gases produced in these machines may give rise to pressure pulses which are associated with the asymmetry of the aerodynamic field, especially in the discharge channels: these pulses create detrimental periodic forces.

By using the method according to the invention, there are no longer metallurgical discontinuities inside the rotor, and this is clearly a major step forward in eliminating this type of problem.

In addition, the welding used in the known art causes distortions which can lead to variations of the width of the rotor blades of 5% or more, particularly in the case of impellers with a low flow rate.

On the other hand the method according to the invention guarantees accuracy of working of 1 or 2%, which permits optimum coincidence of the performance levels planned and those achieved.

Finally, it is apparent that many other variations can be made to the improved method which is the subject of the present invention, for production of a rotor of a centrifugal compressor, without departing from the principles of novelty which are inherent in the inventive concept.

It is also apparent that, in the practical implementation of the invention, any materials, dimensions and forms can be used according to requirements, and can be replaced by others which are technically equivalent.

The scope of protection of the invention is thus delimited by the attached claims.

The invention claimed is:

1. A method for production of a rotor of a centrifugal compressor from a monolithic disc wherein the rotor comprises a plurality of impellers separated by radial cavities, the method comprising:

working said disc in a first radial direction by at least one rotating tool of a numerical control machine, such as to remove shavings and to thereby produce partial radial cavities and partial impellers circumferentially between said partial cavities within said monolithic disc; and working said disc in a second radial direction, substantially opposite to said first radial direction by at least one other rotating tool of the numerical control machine such as to remove shavings and thereby complete, production of said plurality of impellers and said radial cavities.

2. A method according to claim 1 wherein said first tool works, starting from an outer diameter of said disc, until outer partial radial cavities are produced.

3. A method according to claim 2 wherein said first tool advances with successive terracing operations, and works until an intermediate depth is reached relative to an overall width of a circular ring of the said monolithic disc.

4. A method according to claim 3 wherein said second tool works, starting from an inner diameter of said disc, until said second tool reaches said outer partial cavities.

5. A method according to claim 4 wherein said first tool and said second tool are the same tool of the said numerical control machine.

6. A method according to claim 4 wherein said first tool and said second tool work simultaneously, said tools being arranged on two axes which are controlled by at least one numerical control machine.

7. A method according to claim 6 wherein before working with said tools, a preliminary stage is activated in order to ascertain whether there will be superimpositions of said first and second tools during working.

8. A method according to claim 7 wherein in the event of superimpositions, an abnormality is indicated, interrupting a working programme of the numeral control machine.

9. A method according to claim 1 wherein said second tool works from an inner diameter of said disc, until inner portions of said radial cavities are produced.

10. A method according to claim 9 wherein said second tool advances with successive terracing operations and works until an intermediate depth is reached relative to an overall width of a circular ring of said monolithic disc.

11. A method according to claim 10 wherein said first tool works starting from an outer diameter of said disc, until said first tool reaches said inner portions of said cavities, thus completing said radial cavities.

12. A method according to claim 11 wherein said first tool and said second tool are the same tool of said numerical control machine.

13. A method according to claim 1 wherein said first and second tools are used in succession, starting with the shortest in length.

14. A method according to claim 1 wherein the diameter of the said first tool is selected according to a radius of connection at the base of the blade.

15. A method according to claim 1 wherein after a first stage of removing shavings is carried out with a single inclination of an axis of said tool until a maximum depth is reached, a command is transmitted to take said tool to a different inclination.

16. A method according to claim 15 wherein said different inclination is implemented by a numerical control machine which has five controlled axes.

17. A method according to claim 1, wherein after said working to remove shavings, said rotor is subjected to heat treatment.

18. A method according to claim 17 wherein said heat treatment is followed by stages of checking of the dimensions, balancing, and dynamic checking of said rotor.

19. A method according to claim 1 wherein said rotor is made of steel.

* * * * *